Nov. 8, 1949  C. T. COLLINS  2,487,524
AUTOMOBILE GARMENT SUPPORT
Filed Sept. 2, 1947

INVENTOR.
Chester T. Collins
BY Arthur H. Sturges
Attorney

Patented Nov. 8, 1949

2,487,524

UNITED STATES PATENT OFFICE 2,487,524

AUTOMOBILE GARMENT SUPPORT

Chester T. Collins, Bellevue, Nebr.

Application September 2, 1947, Serial No. 771,590

2 Claims. (Cl. 224—29)

1

The present invention relates to automobile accessories and has for an object to provide a device which may be readily disposed within and attached to the body of an automobile in a manner whereby garments, clothing and the like may be suspended therefrom during road traveling movements of the vehicle.

Another object of the invention is to provide a garment support as described, the height of which is adjustable for attachment to different types and models of cars.

Another object of the invention resides in the provision of a particular and advantageous means for regulating the height of a standard employed.

A further object of the invention resides in the provision of a garment supporting device which may be attached to an automobile in a manner whereby the interior of the latter is not marred or altered.

Still another object of the invention resides in the provision of a rigid bracing means particularly adapted for use with a device as described.

Still further objects of the invention reside in the provision of a garment support the various parts of which may be dismantled for convenient storage and the two parts of a standard employed may be telescopically overlapped for storage.

Yet another object of the invention resides in the provision of a base or foot for use with the garment support for reducing the tendency of an automobile floor to become worn from the downward thrust of a standard employed.

Other and still further objects and advantages of the invention will become apparent from the following detailed description of a preferred embodiment thereof.

Figure 1:
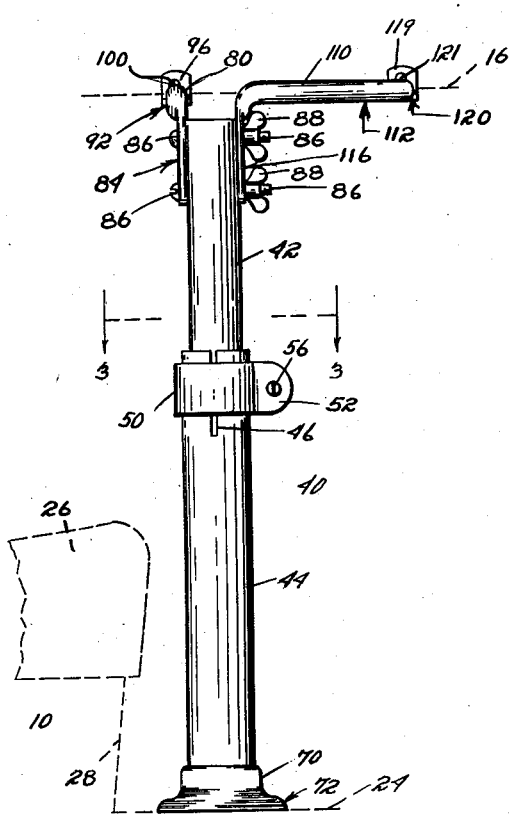
Figure 1 is a side elevation of the garment support of the invention, shown as disposed in an automobile, a rear seat cushion, the rear floor, and the upper edge of the door-jamb being shown in dotted lines.

The garment support of this invention is for use in an automobile, the latter being generally

2 indicated at 10. The automobile is preferably of the type having a space 12 existing between a door 14 thereof and the upper side 16 of the door jamb, for a purpose later described. Modifications of the device will fit on any auto, however.

The automobile 10 also includes a roof 20, a rain gutter 22, a rear floor 24, a rear seat 26, a rear seat support 28 and has a special construction for sealing the junction between the door 14 and the floor 24.

The said construction forms no part of this invention but usually includes a vertically extending rib 30 on the outer edge of the floor 24, a horizontally extending ledge 32 along the outer side of the floor 24 and forming the bottom side of the door jamb, a notch 34 in the bottom of the door 14 for receiving the ledge 32, and a gasket 36 for sealing the junction between the ledge 32 and the notch 34.

The garment support of the invention includes a standard generally indicated at 40 having an upper portion 42 and a lower portion 44, the latter being preferably of tubular shape and being disposed one partially within the other. The outermost section 44 of the standard 40 is provided with a longitudinally disposed slot 46 extending thereinto from that end of the section 44 which is adjacent the junction between the sections 42 and 44.

A band 50 is provided having a generally circular main body portion of a diameter for encircling the upper end of the lower standard section 44. The ends of the band 50 extend in parallelism with each other at substantially a right angle with respect to the adjacent portions of the circular main body portion of the band 50. The said ends thereby form tabs 52 and 54 and the latter are provided with suitable aligned apertures for receiving a bolt or threaded screw 56.

The screw 56 is provided with a notch 58 in the head thereof for receiving the bit of a screwdriver. The opposite end of the screw 56 is provided with a wing nut 60, threadedly secured thereto.

The standard 40 is adapted to be disposed upright within the body of the automobile and placed into a position spaced apart from a selected door-jamb thereof. A foot 70 is preferably disposed on the lower end of the standard 40 and is secured thereto in any suitable manner. The foot 70 is for supporting the standard 40 and for engaging the floor 24 of the automobile.

The foot 70 is provided with an outwardly flanged base portion 72 of a larger area in horizontal cross-section than adjacent portions of the lower section 44 of the standard 40. This is to reduce the tendency of the floor 24 to become worn from the downward thrust of the standard 40 under the weight of garments.

Preferably the foot 70 is constructed of rubber or other suitable material for reducing wear on the floor 24. This is especially desirable since floors are usually covered with carpeting which is more susceptible to wear from friction than are harder surfaces.

At the upper end of the standard 40 a hanger bar 80 is secured thereto and the latter is preferably of tubular shape along its main body portion. The hanger-bar 80 extends from the standard 40 toward the upper side 16 of the door jamb of the automobile 10.

At its inner end the hanger-bar 80 is provided with a flat portion 84 having apertures therethrough for the reception of suitable screws or bolts 86. The latter extend through other suitable apertures in the upper standard section 42 and are preferably provided with wing nuts 88 so that the hanger-bar 80 may be easily disengaged from the upper section 42 of the standard 40.

The other end of the hanger-bar 80 is provided with a second flattened portion 92, the latter being disposed in a horizontal plane. The vertical thickness of the portion 92 is lesser than the vertical width of the space 16 so that the portion 92 is adapted to be disposed in the space 16 even at times when the door 14 is closed.

The door-jamb 16 is further provided with a vertically disposed surface 94 along its upper side, the latter being disposed outwardly of the flat horizontal surface 16 and being disposed at a right angle and adjoined thereto. The extreme outer terminal end of the hanger bar 80 is vertically disposed as shown at 96 and the latter is so that the vertically disposed terminal end portion 96 is adapted to be disposed opposite the vertically disposed surface 94.

The terminal end portion 96 is provided with a horizontal aperture for the reception of a suitable metal screw 100, and the latter is preferably provided with a flat head, either flush or countersunk into the outer surface of the terminal end 96. The inwardly disposed end of the screw 100 is threadedly disposed in the door jamb, extending through the vertically disposed surface 94.

Means are provided for maintaining the standard 40 upright during use, and such means preferably include a brace-bar 110. The latter is provided with a preferably tubular or rounded main body portion 110. The inward end of the brace-bar 110 is provided with a downwardly extending flat vertical portion 116, the latter being for the purpose of engaging the side of the upper standard section 42.

The inward flat portion 116 is provided with two spaced apart apertures for the reception of the bolts 86 and the portion 116 is disposed between the nuts 88 and the upper standard section 42. The flattened inward portion 116 of the brace-rod 110 is disposed in a plane preferably transversely disposed with respect to the automobile 10. The tubular center portion 112 is, however, inclinedly disposed outwardly and forwardly at its outer end.

The outer end of the brace-bar 110 is provided with a second flat portion 120 and the latter is preferably of a vertical thickness for reception between the door 14 and the lower surface 16 of the upper side of the door-jamb.

The extreme outer terminal end of the brace-bar 110 is provided with an upturned vertically disposed portion 119 having an aperture 121. The portion 119 is disposed in a longitudinal plane with respect to the automobile 10 and is adapted to be positioned opposite the vertical surface 94 and is secured thereto by means of a suitable counter sunk or flush, flat-headed screw 122, similar in all respects to the screw 100.

The terminal end 121 of the brace-bar 110 is disposed forwardly of the car 10 during use and with respect to the terminal end 96 of the hanger-bar 80 so that the standard 40 will be rigidly braced thereby.

In operation, the device may be brought from storage and assembled, the foot 70 being placed upon the lower standard section 44. The hanger bar 80 and the brace-bar 110 are then attached by means of the bolts 86 to the upper standard section 42. The device may then be placed in the interior of an automobile opposite a door-jamb and the height of the standard 40 is then adjusted by releasing the wing nut 60 to permit the band 50 to relax so that the longitudinal walls of the slot 46 spread apart and the sections 42 and 44 are slideable with respect to each other.

When the flat and outer portions of the hanger bar 80 and brace-bar 110, respectively, are disposed against the lower surface 16 of the upper side of the door-jamb, and the vertically disposed portions 96 and 119 are disposed opposite the vertically disposed surface 94, the wing nut 60 may be tightened for clamping the standard sections 42 and 44 into position, the longitudinal walls of the slot 46 being drawn toward each other.

The screws 100 and 122 may then be disposed through the suitable apertures in the vertically disposed sections 96 and 119 of the hanger-bar 80 and of the brace-bar 110 respectively, and are threadedly secured to the door-jamb.

Figure 2:
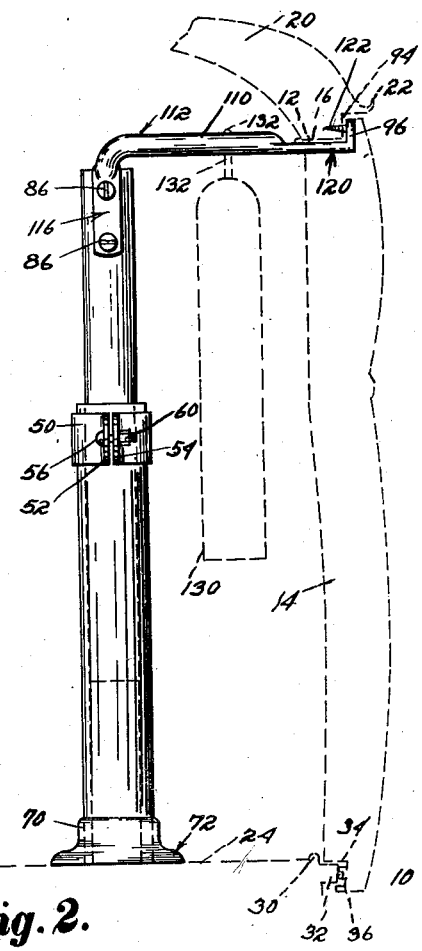
Figure 2 is a frontal elevation of the garment support shown in Figure 1, the rear floor, upper and lower sides of the rear door-jamb, the rear door, and a garment bag all being shown in dotted lines.
Figure 3:
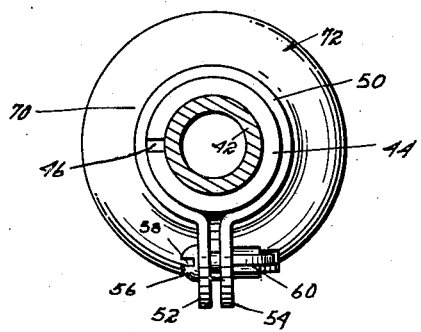
Figure 3 is a view-in-section of the device taken along the line 3—3 of Figure 1.
Figure 4:
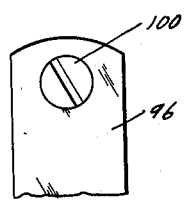
Figure 4 is a view of a vertically disposed terminal end portion of a hanger bar of the garment support.

As thus described, garments may be hung upon the hanger-bar 80 and, if desired, garment bags such as that shown in Figure 2 at 130 may be employed, the latter commonly having a wire hook 132 in the upper end thereof.

When it is desired to remove the device, the screws 100 and 121 may be easily removed, the hanger-bar 80 and the brace-bar 110 disconnected from the upper standard section 42, and the standard sections 40 and 42 disposed almost completely one inside the other. In this manner the device may be easily stored in a small space.

This invention has provided a garment support for use in automobiles, the height of which is adjustable for different cars, which is particularly constructed so that the interior of a vehicle will not need to be altered to facilitate its temporary use, and which is provided with a foot for preventing wear on the floor of an automobile during use.

From the foregoing description, it is thought to be obvious that an automobile garment support constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. A garment support for use in an automobile having a space between a door thereof, when the latter is closed, and the upper side of the corresponding door-jamb, said door-jamb also having a vertically disposed surface, along the upperside, comprising; a standard disposed upright within the body of said automobile during use and spaced from said door-jamb; a foot disposed on and supporting the lower end of said standard for engaging the floor of said automobile, said foot being of a larger area in horizontal cross-section at its base than adjacent portions of said standard for reducing the tendency of said floor to become worn from the downward thrust of said standard during use, and said foot being constructed of resilient material; a hanger-bar secured at one of its ends to the upper end of said standard and extending toward said door-frame, the other end portion of said hanger-bar extending into said space, and said other end portion having an upwardly extending terminal end disposed opposite said vertically disposed surface; a screw disposed through said terminal end and through said vertically disposed surface; a brace-bar secured at one end of its ends to the upper end of said standard, said other end portion of said brace-bar extending into said space at a point spaced from said other end portion of said hanger-bar, and said brace-bar having a second upwardly extending terminal end disposed against said vertically disposed surface; and a second screw disposed through said second terminal end and through said vertically disposed surface.

2. A device as described in claim 1 in which said standard is composed of two telescopic sections disposed one partially within the other, the outermost of said sections being provided with a longitudinally disposed slot extending thereinto from that end thereof which is adjacent the junction of said telescopic sections; a band disposed around the outermost of said sections; and across said slot, said band having spaced apart ends; and means for drawing said ends together.

CHESTER T. COLLINS.

REFERENCES CITED

The following references are of record in the file of this patent:

UNITED STATES PATENTS

| Number | Name | Date |
| --- | --- | --- |
| 2,144,772 | Plants | Jan. 24, 1939 |
| 2,472,132 | Walker | June 7, 1949 |